(12) United States Patent
Deliz Centeno et al.

(10) Patent No.: US 12,155,704 B2
(45) Date of Patent: *Nov. 26, 2024

(54) CONVERSATION PRIVACY FOR THIRD PARTY APPLICATIONS

(71) Applicant: Apple Inc., Cupertino, CA (US)

(72) Inventors: Luis R Deliz Centeno, Oakland, CA (US); Joseph P. Cerra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,292

(22) Filed: Nov. 13, 2023

(65) Prior Publication Data

US 2024/0163319 A1 May 16, 2024

Related U.S. Application Data

(63) Continuation of application No. 18/188,790, filed on Mar. 23, 2023, now Pat. No. 11,856,039, which is a
(Continued)

(51) Int. Cl.
*H04L 65/403* (2022.01)
*H04L 65/1089* (2022.01)
*H04N 7/15* (2006.01)

(52) U.S. Cl.
CPC ........ *H04L 65/403* (2013.01); *H04L 65/1089* (2013.01); *H04N 7/157* (2013.01)

(58) Field of Classification Search
CPC .... H04L 65/403; H04L 65/1089; H04N 7/157
(Continued)

(56) References Cited

U.S. PATENT DOCUMENTS 7,355,621 B1 4/2008 Fernandez
8,990,329 B1 3/2015 Khvostichenko
(Continued)

FOREIGN PATENT DOCUMENTS

WO 2018071190 A1 4/2018
WO 2018148084 A1 8/2018
(Continued)

*Primary Examiner* — Wing F Chan
*Assistant Examiner* — Leon Y Tseng
(74) *Attorney, Agent, or Firm* — Blank Rome LLP

(57) ABSTRACT

The disclosure pertains to techniques for collaborating in a multiuser communication session, including, at a first device, receiving a request to launch a first application in a multiuser communication session with a second device; presenting an environment of the first application in the multiuser communication session; receiving, by one or more processes of the multiuser communication session, data from the first user, the data including input data and first communications data; providing, by the one or more processes, the input data to the first application; providing, by the one or more processes, the first communications data to the second device; receiving, by the one or more processes, second communications data from the second device; and presenting, by the one or more processes, the second communications data in the environment of the first application, wherein the first application is restricted from accessing the first communications data and second communications data.

20 Claims, 7 Drawing Sheets

Related U.S. Application Data continuation of application No. PCT/US2021/050468, filed on Sep. 15, 2021.

(60) Provisional application No. 63/082,801, filed on Sep. 24, 2020.

(58) Field of Classification Search
USPC .......................................................... 709/204
See application file for complete search history.

(56) References Cited

U.S. PATENT DOCUMENTS

| | | |
|---|---|---|
| 2008/0229215 A1 | 9/2008 | Baron |
| 2015/0170529 A1* | 6/2015 | Hafeez .................. H04L 65/403 |
| | | 434/350 |
| 2018/0314484 A1 | 11/2018 | Pahud |
| 2020/0066044 A1 | 2/2020 | Stahl |
| 2020/0066046 A1 | 2/2020 | Stahl |
| 2020/0075026 A1 | 3/2020 | Peeler |
| 2020/0233681 A1 | 7/2020 | Garstenauer |

FOREIGN PATENT DOCUMENTS

| | | |
|---|---|---|
| WO | 2018152455 A1 | 8/2018 |
| WO | 2018223229 A1 | 12/2018 |

\* cited by examiner

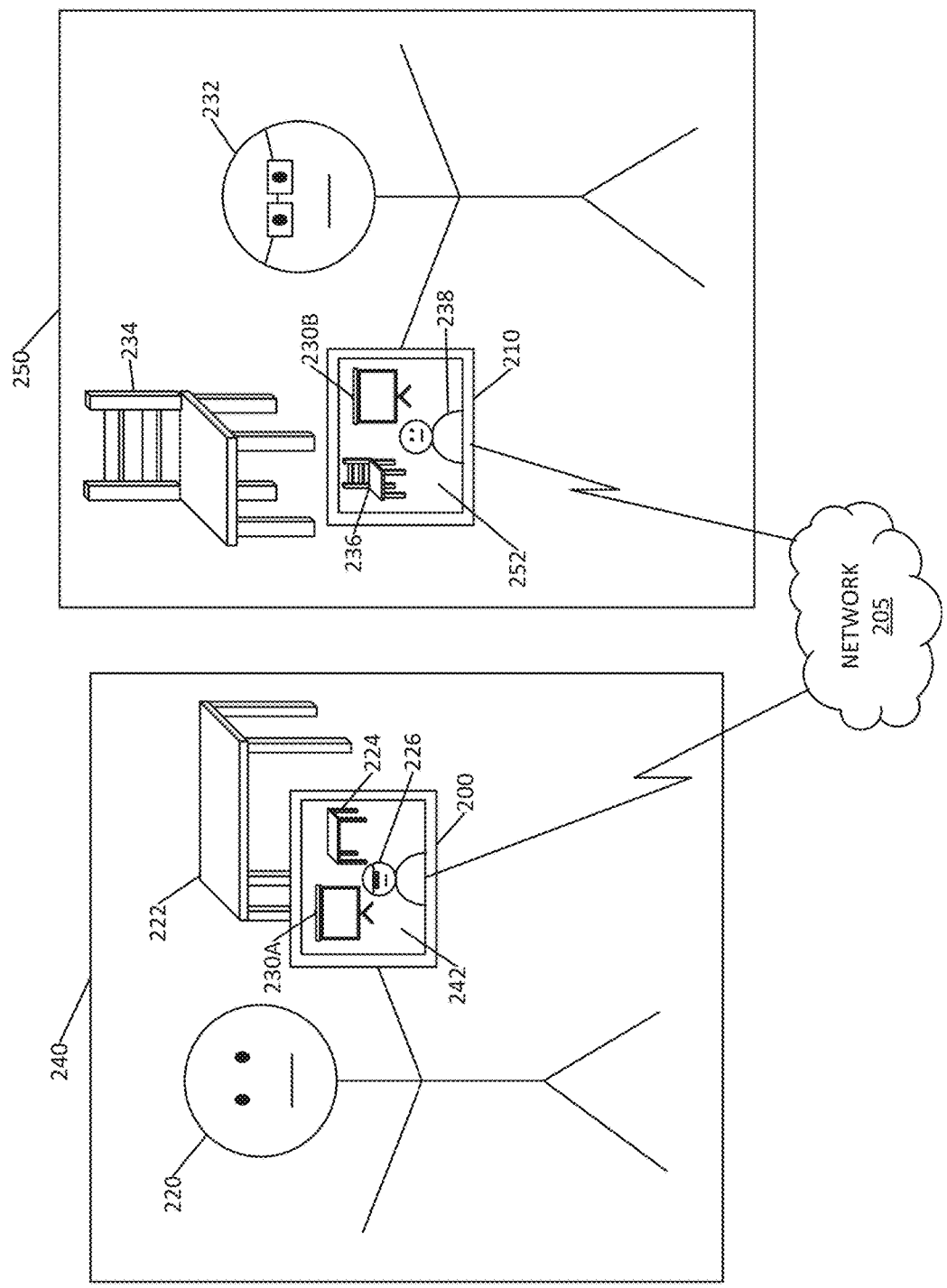

CONVERSATION PRIVACY FOR THIRD PARTY APPLICATIONS

BACKGROUND

This disclosure relates generally to multiuser environments. More particularly, but not by way of limitation, this disclosure relates to techniques and systems for conversation privacy for third party applications executing in the context of a multiuser communications environment, such as an extended reality (XR) environment (XRE).

Some devices are capable of generating and presenting an XRE. An XRE may include a wholly or partially simulated environment that people sense and/or interact with via an electronic system. In an XRE, a subset of a person's physical motions, or representations thereof, are tracked, and, in response, one or more characteristics of one or more virtual objects simulated in the XRE are adjusted in a manner that comports with at least one law of physics. Some XREs allow multiple users to interact with each other within the XRE. However, what is needed is a technique to host applications in an XRE while managing the private information of users.

BRIEF DESCRIPTION OF THE DRAWINGS

FIG. 2 shows a diagram of example operating environments, according to one or more embodiments.

DETAILED DESCRIPTION

Figure 1:
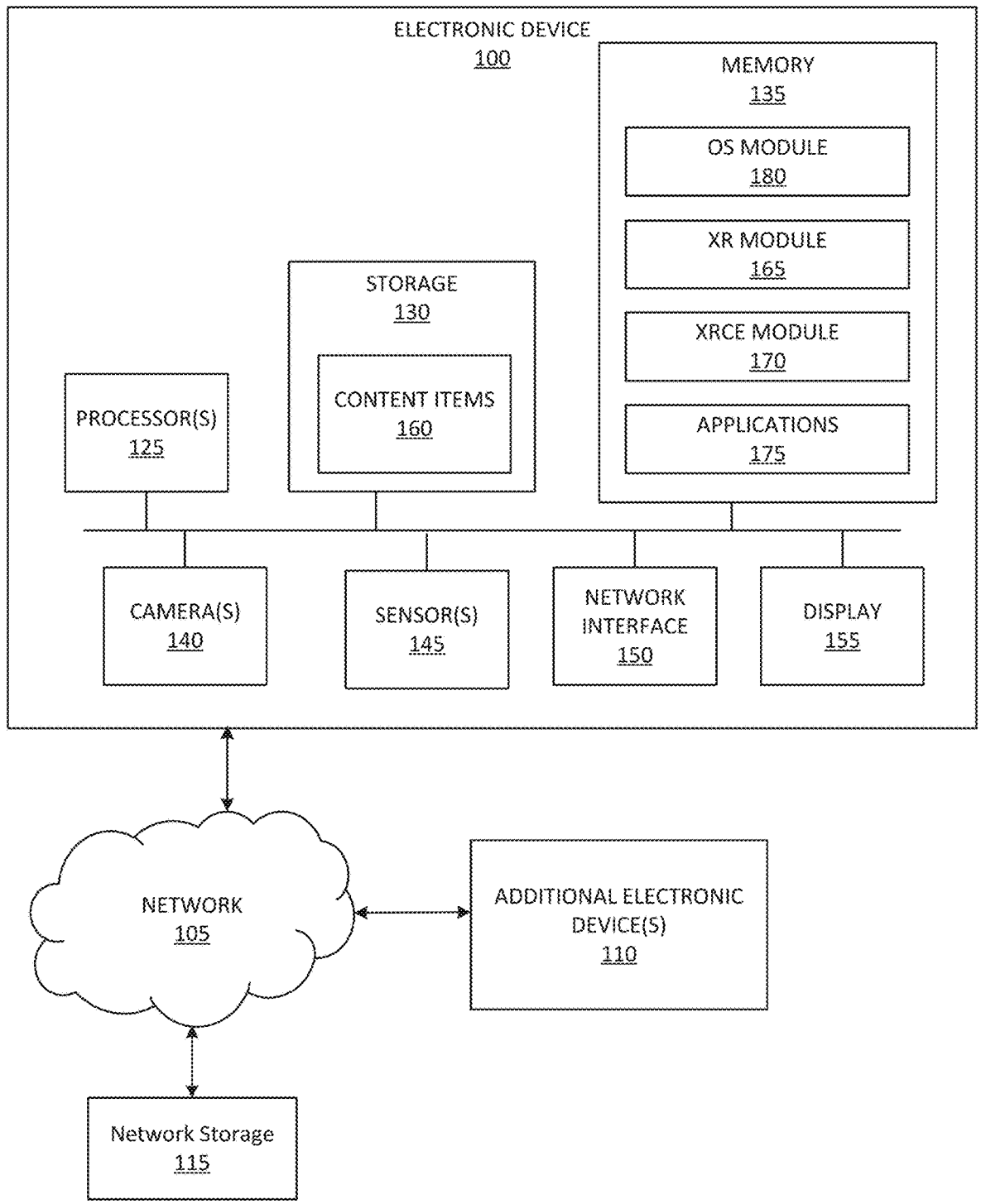
FIG. 1 shows, in block diagram form, a simplified system diagram according to one or more embodiments.

This disclosure pertains to techniques for users collaborating within an extended reality environment (XRE) to share an application experience. Certain applications may be experienced by multiple users in an XRE. In certain cases, it may be desirable for certain applications to present an application environment in place of the XRE. For example, a gaming application or multiuser painting application may present their own environment in place of the XRE, while retaining certain elements of the XRE, such as avatars and voice communications as between participants. In certain cases, there may be privacy concerns with allowing applications to potentially be able to access voice communications, visual representations of participants, or identifiable information about the participants of the application experience. Thus, it may be desirable to allow an application program to present an application environment in place of the XRE, while preventing the application from accessing potentially sensitive information.

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user, similar to how such views and sounds would change in a physical environment. In another example, the XR system can detect movement of an electronic device that presents the XR environment (e.g., a mobile phone, tablet, laptop, or the like) and adjust graphical content and auditory content presented to the user, similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with, and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, an XR communication (XRC) session refers to an XR multiuser communication session such as an XRE in which two or more devices are participating.

For purposes of this disclosure, a local XRC device refers to a current device being described, or being controlled by a user being described, in an XRC session.

For purposes of this disclosure, colocated XRC devices refer to two or more devices that share a physical environment and an XRC session, such that the uses of the colocated devices may experience the same physical objects and XR objects.

For purposes of this disclosure, a remote XRC device refers to a secondary device that is located in a separate physical environment from a current, local XRC device. In one or more embodiments, the remote XRC device may be a participant in the XRC session.

For purposes of this disclosure, shared virtual elements refer to XR objects that are visible or otherwise able to be experienced in an XRE by participants in an XRC session.

For purposes of this disclosure, an XRC computing environment (XRCE) refers to a computing environment or container of an XRC session capable of hosting applications. The XRCE enables applications to run within an XRC session. In certain cases, the XRCE may enable users of the XRC session to interact with hosted applications within the XRC session.

For the purposes of this disclosure, an XRCE instance refers to an XRCE of a current device being described, or being controlled by a user being described. The XRCE instance can allow the user to participate in an XRC session and run an application in the XRC session.

For the purposes of this disclosure, a second XRCE instance refers to an XRCE of a secondary device, or being controlled by a second user, in the XRC session, other than the local XRCE instance. The second XRCE instance may be remote or colocated.

For the purposes of this disclosure, an XRCE application refers to an application which is capable of executing within the context of an XRCE.

For the purposes of this disclosure, a second XRCE application refers to an XRCE application of a secondary device, or being controlled by the second user, in the XRC session, other than the local XRCE application. The second XRCE application may be remote or colocated.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. According to one or more embodiments, electronic device 100 is utilized to participate in an XRC session. It should be understood that the various components and functionality within electronic device 100, additional electronic device 110 and network storage 115 may be differently distributed across the devices, or may be distributed across additional devices.

Electronic device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer readable storage medium capable of storing computer readable code. Memory 135 may store various programming modules for execution by processor(s) 125, including XR module 165, XRCE module 170, and other various applications 175. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may be configured to store content items 160, according to one or more embodiments.

Electronic device 100 may also include one or more cameras 140 or other sensors 145, such as depth sensor, from which depth of a scene may be determined. In one or more embodiments, each of the one or more cameras 140 may be a traditional RGB camera, or a depth camera. Further, cameras 140 may include a stereo- or other multi-camera system, a time-of-flight camera system, or the like. Electronic device 100 may also include a display 155. The display device 155 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

According to one or more embodiments, memory 135 may include one or more modules that comprise computer readable code executable by the processor(s) 125 to perform functions. The memory may include, for example an XR module 165 which may be used to provide an XRE for a local XRC device. An XRCE module 170 may generate an environment supporting the XRE. For example, the XRCE module 170 may provide services and/or application programming interfaces that may be used by the XRE and/or hosted applications to interface with the operating system (OS) and/or hardware of the electronic device 100. The XRC session may be a computing environment which supports a shared experience by electronic device 100 as well as additional electronic devices 110.

The memory 135 may also include an OS module 180, for supporting basic functionality and managing hardware of the electronic device 100. The OS module 180 provides an environment in which applications 175 may execute within. The XRCE module 170 and XR module 165 may run within the context of the OS module 180, in certain cases. In other cases, XRCE module 170 and XR module 165 may handle basic functionally and manage hardware of the electronic device 100 in parallel with, or in place of, the OS module 180. The XRCE module 170 also provides an environment in which applications 175 may execute within. Applications 175 may include, for example, computer applications that may be experienced in an XRC session by multiple devices, such as electronic device 100 and additional electronic devices 110.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

FIG. 2 shows a diagram of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

FIG. 2 shows a diagram of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 2, the first environment 240 includes a first user 220 that is utilizing a first electronic device 200, and the second environment 250 includes a second user 232 that is utilizing a second electronic device 210. In one or more embodiments, the first electronic device 200 and the second electronic device 210 include mobile devices, such as handheld devices, wearable devices, and the like.

In one or more embodiments the first electronic device 200 and the second electronic device 210 communicate with each other via a network 205. Examples of network 205 may include, for example, the Internet, a wide area network (WAN), a local area network (LAN), etc. In one or more embodiments, the first electronic device 200 and the second electronic device 210 may be participating in an XRC session.

Although electronic device 200 and second electronic device 210 may be participating in the common XRC session, the XRE may be rendered differently on each device. As shown, the electronic device 200 may depict physical objects of the environment 240. As shown, physical table 222 may be depicted on the display 242 as a virtual table 224. In one or more embodiments, the display 242 may be a see-through display, and virtual table 224 may simply be a view of physical table 222 through display 242.

Display 242 of electronic device 200 may also include an avatar 226 corresponding to user 232 in physical environment 250. For purposes of this disclosure, an avatar may include a virtual representation of a user. The avatar may depict real-time actions of the corresponding user 232, including movement, updated location, and/or interactions with various physical components and/or virtual components within the XRC session. An avatar may or may not mimic physical characteristics of the user, and may or may not mimic facial expressions of the user.

According to one or more embodiments, a XRCE may be an XRC session that supports one or more XRCE applications or other modules which provide depictions of objects across all participating devices, such as electronic device 200 and second electronic device 210. As shown in display 242, presentation panel 230A is an example of a virtual object which may be visible to all participating devices.

As an example, returning to environment 250, second electronic device 210 includes a display 252, on which the presentation panel virtual object 23013 is depicted. It should be understood that in one or more embodiments, although the same virtual object may be visible across all participating devices, the virtual object may be rendered differently according to the location of the electronic device, the orientation of the electronic device, or other physical or virtual characteristics associated with electronic devices 200 and 210 and/or the XRCE depicted within displays 242 and 252.

Returning to environment 250, another characteristic of an XRC session is that while virtual objects may be shared across participating devices, physical worlds may appear different. As such, physical chair 234 is depicted as virtual chair 236. As described above, and one or more embodiments, display 252 may be a see-through display, and virtual chair 236 may be a view of physical chair 234 through the see-through display 252. In addition, second electronic device 210 depicts an avatar 238 corresponding to user 220 within physical environment 240.

According to one or more embodiments, the virtual objects, such as presentation panel 230, may be rendered in conjunction with an XRCE application. In one or more embodiments, multiple XRCE applications may be executed within an XRCE. For example, the XRCE can host XRCE applications within the XRE of the XRCE as virtual objects. While hosted within the XRCE, XRCE applications may be executed as separate processes from one or more processes of the XRCE. As discussed further below, an application may be configured to be run either within or outside of an XRCE. For example, an application may include multiple operating modes based on an operating environment, or context, in which the application is executing, for example an XRCE mode, and a non-XRCE mode. It may be determined that the application is running within the context of the XRCE, such as through an application programming interface (API) and operate in the XRCE mode. The application, when run outside of the XRCE, may run in the non-XRCE mode. For example, when run in the context of an OS of the electronic device, rather than the XRCE, the application runs in the non-XRCE mode. As used herein, the XRCE application or hosted application may also refer to an application running in XRCE mode as well as an application that is solely configured to run within the context of an XRCE. The XRCE may provide a container or computing environment in which an XRCE application may run, in a manner similar to an operating system. These containers may be presented to the user as virtual objects, such that the XRCE application appears to be executing in a window, on a surface, or another virtual object.

In certain cases, the XRCE applications are executed in the context of a specific XRCE instance. For example, a first user, associated with a first device, may be participating in an XRC session with a second user, associated with a second device. The XRCE application in this example executes on both the first and second device. Based on input from the first user, the first device may execute a first XRCE application hosted in a local XRCE instance. The first XRCE application may share data with a second XRCE application hosted in a second XRCE instance executing on a second device. Executing a hosted application within a context of a specific XRCE instance helps provide a measure of privacy for the local user within the XRCE. In certain cases, XRCE instances may be executed in local devices. In other cases, XRCE instances may execute, at least in part, on a network or hosted device.

In certain cases, users of the XRC session may desire to share an application experience of an XRCE application with other users of the XRC session. For example, a set of users may want to experience an XRCE application together, such as a game, a group painting application, productivity application, etc. as a shared XRCE application experience within the XRC session. In certain cases, an application may be configured to be run in either within or outside of an XRCE. For example, the application may determine that it is running within the context of the XRCE, such as through an API, and operate in an XRCE mode. Allowing an XRCE application access to data from the XRCE may raise privacy concerns. For example, it may not be desirable to allow an XRCE application to access the voice data, avatars, or other communications data as between users in a shared XRCE application experience. To help maintain the privacy, the XRCE application may be restricted in the type of data the XRCE application may receive.

Figure 3A:
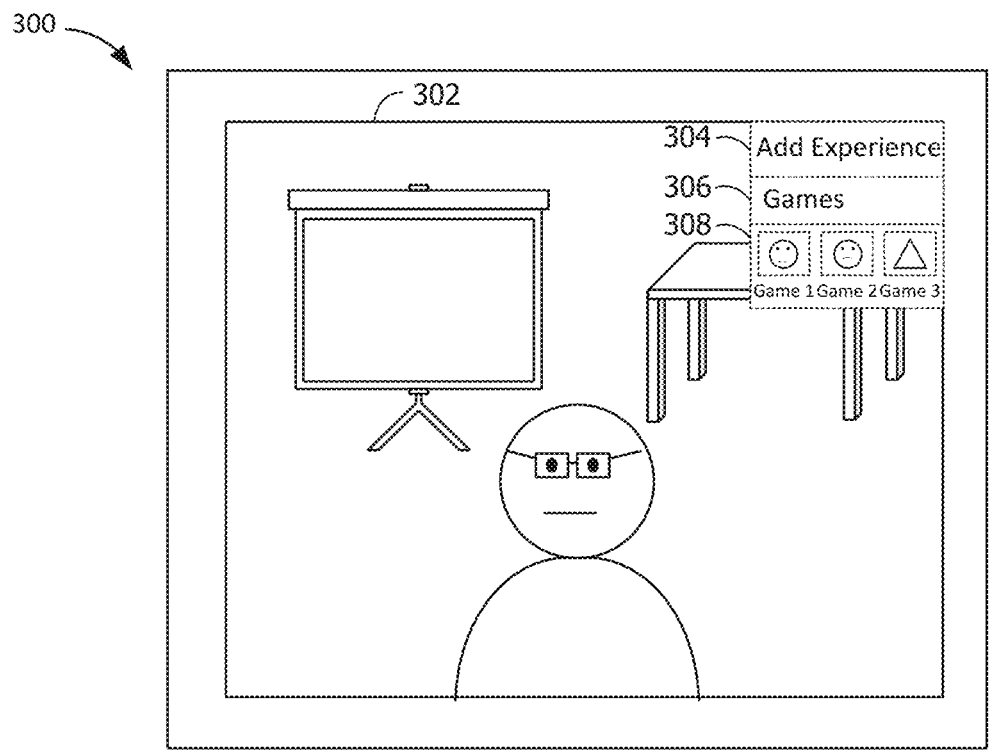
FIGS. 3A and 3B are line drawings illustrating interfaces for bringing an application experience to the multiuser communication extended reality environment, in accordance with aspects of the present disclosure.

FIG. 3A is a line drawing illustrating an interface of an XRCE 300 for bringing an XRCE application experience to the XRCE, in accordance with aspects of the present disclosure. In certain cases, the XRCE 302 may be displaying a view into a shared XRC session. The XRCE 302 may include an interface, such as a menu, gesture, voice command, or other interface that a user may utilize to select an application to bring into the XRCE 302. In this example, the XRCE 302 includes a menu 304 for bringing an application experience to the XRCE 302. The menu 304 may be subdivided, for example, to categorize the XRCE applications available. In this example, a games category 306 is selected, which displays a listing 308 of available apps that may be brought into the XRCE 302.

Figure 3B:
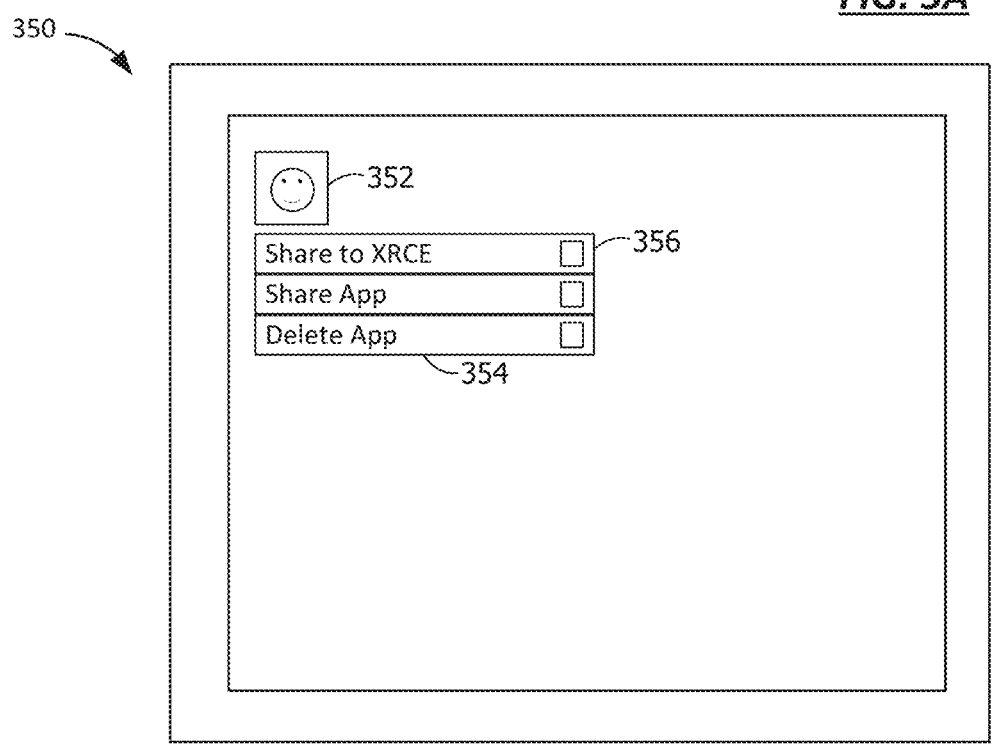

In certain cases, the XRCE may be running, for example, as a background application. For example, the user may switch out of an active XRCE and into another application to browse for and/or select an application to bring into the XRC session. FIG. 3B is a line drawing illustrating another interface for bringing an application experience to the XRC session 350, in accordance with aspects of the present disclosure. In this example, the interface for sharing content is executing outside of the context of the XRCE. As an example, a user may be browsing applications or content on their device and accesses the interface for bringing an application experience into the XRCE, for example, using a button, long press, selecting a content item, etc. In this example, a user may select an application 352 and access a context menu 354 associated with the application 352. The context menu 354 includes a menu item 356 to bring the application experience into the XRCE. In certain cases, an XRCE application may be accessed from within the XRCE by a user without the XRCE application being visible to other users of the XRCE. In certain cases where the XRCE is not running, an XRCE instance may be started and then the application brought into the XRCE.

In certain cases, the XRCE may include functionality which applications may be able to utilize. As an example, a first user may be in an XRC session with a second and third user and the first user may start an application experience with the XRCE application with the second user. The XRCE application may be invoked or launched with an indication, such as with a flag or switch, that the XRCE application is executing in the context of an XRC session. In certain cases, starting an XRCE application experience between multiple users in an XRC session may start an instance of the XRCE application on the local device of each user. For example, the XRC session may invoke the XRCE application on each local device of each user participating in the application experience. The application may access one or more APIs that allow the application to utilize features offered by the XRCE session. For example, the XRCE application may be able to call APIs provided by the XRCE to access functionality provided by the XRCE. In certain cases, the XRCE may provide data transfer, networking, audio, video, and avatar handling functionality that the XRCE application can use when the XRCE application is executed in the context of the XRCE. Continuing with the example, where a participant in the application experience does not have the XRCE application, such as the second user, the XRCE application, such as the one executing on the local device of the first user, may utilize the networking functionality of the XRCE and transmit, or cause the second device to otherwise acquire a version of the XRCE application for use during the application experience. In certain cases, the version of the XRCE application may offer reduced or different functionality as compared to the full XRCE application. The instance of the XRCE application associated with the first user may then use the networking functionality offered by the XRCE to transmit data to other instances of the XRCE application.

According to aspects of the present disclosure, graphical data from the XRCE application may be incorporated into a video stream of the XRC session along with visual representation data. Visual representation data is graphical data representative of users, such as avatars and/or video data from users. The visual representation data is collected, for example by an XRCE instance and distributed among the other devices participating in the XRC session. In certain cases, the visual representation data may be handled by another XRCE application. This other XRCE application may be integrated into the XRCE, for example, as a first party logical component of the XRCE separated out, for example to allow for separate updates to be sent, or as a trusted application, either first or third party.

Users may be associated with avatars within the XRE. In the XRE, avatars are generated, packaged into a video stream, and distributed to other participants of the XRC session. Animation of the avatars and/or effects applied to the avatars, along with video, if any, as between participants in the XRC session may also be handled by the XRCE instance and may be based on information in the video stream.

Figure 4:
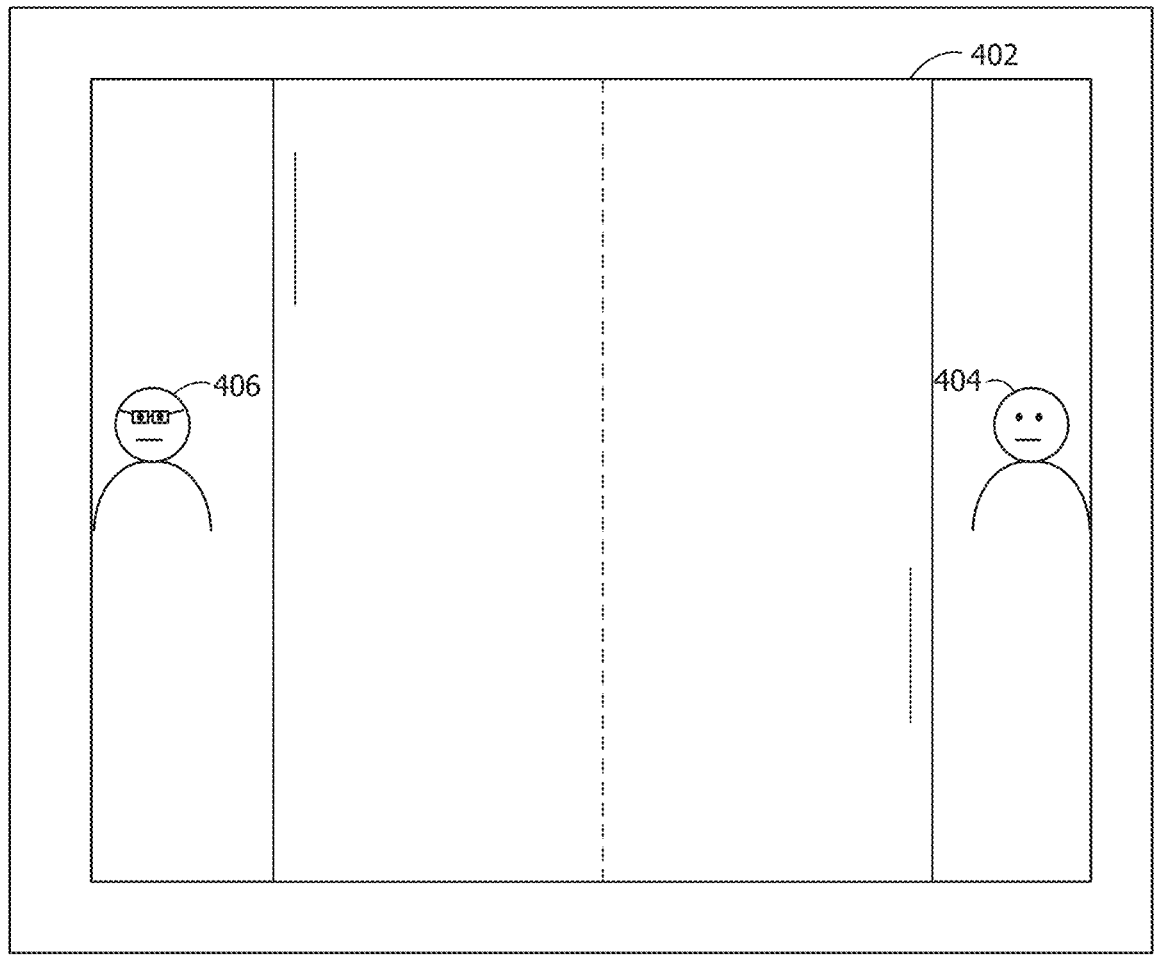
FIG. 4 is a diagram illustrating an application experience, in accordance with aspects of the present disclosure.

When an XRCE application is running in the context of an XRCE instance, such as during an application experience, graphics provided by the XRCE application may be passed to the XRCE instance, for example via an API, and sent as a part of a video stream for the XRC session. In certain cases, a graphical environment of the XRCE application may be displayed as a part of the graphical environment of the XRC session. In other cases, the graphical environment of the XRCE instance may be replaced by a graphical environment of the XRCE application during an application experience. FIG. 4 is a diagram illustrating an application experience 400, in accordance with aspects of the present disclosure. In this example application experience 400, the graphical environment of the XRCE application 402 is shown in place of the graphical environment of the XRCE instance. In certain cases, graphical data generated by the XRCE application may be sent, for example via an API, to the XRCE instance and integrated into the video stream of the XRC session, along with visual representation data, such as avatars. According to aspects of the present disclosure, avatars representing the first user 404 and second user 406 continue to be drawn by the XRCE instance into the graphical environment of the XRCE application 402. For example, where two users are participating in an XRCE experience, the XRCE application may provide location information for where to display two avatars representing the two users. Animation, effects, etc. of the avatars may be presented by the XRCE instance in the graphical environment of the XRCE application 402 in a way similar to those presented in the graphical environment of the XRC. For example, the XRCE may have access to avatar information for the local user and the XRCE may render the avatar representing the local user at a location corresponding to the location information provided by the XRCE application. Similarly, the local XRCE may receive avatar information from a second XRCE application. The avatar information may contain information for rendering and/or animating a second avatar representing the second user. The XRCE application may render the second avatar at a location corresponding to location information provided by the XRCE application. In certain cases, the second XRCE application may also provide location information for one or more avatars. In certain cases, animations associated with or graphical representation of users themselves may be adjusted or altered based on participation in the application experience.

When receiving a video stream, the incoming video stream is processed by the local XRCE instance and graphical data for an XRCE application may be directly presented by the XRCE instance, or the graphical data for the XRCE application may be extracted from the received video stream and passed to the XRCE application for processing and presentation. As the XRCE application only has access to the graphical data generated by or used by the XRCE application, the XRCE application cannot access the visual representations of the users.

In certain cases, the XRCE application may be able to control aspects of the visual representation data. For example, the XRCE application may request that the XRCE instance not display graphical representations of the users. In such cases, the avatars and/or other graphical representations of the users may be hidden. As another example, the XRCE application may provide location information and/or sizing information for the graphical representations to the XRCE instance. This helps allow the XRCE application indicate where to position, for example, user avatars within the XRCE application environment to help optimize the application experience. In this example, the first user 404 is positioned opposite of the second user 406 across a game board generated by the XRCE application. In certain cases, the XRCE application may change or update the positions and/or sizes of the graphical representations of the users. In certain cases, the XRCE application may provide location information on a per-participant basis. For example, the XRCE application may be able to access non-personally identifiable information, such as a user identifier, about a user via the XRCE instance. Locations and/or size information for graphical representations of the user may then be provided separately for each user identifier. This non-personally identifiable information may be changed or randomized between instances of the application experience. In certain cases, the XRCE application may include a sign-in or account functionality within the XRCE application. In such cases, a participant may sign in, or create an account, and the XRCE application may be able to associate non-personally identifiable information provided by the XRCE instance with the account or sign-in.

According to certain aspects, the audio content associated with, or representative of, the user may also be handled by the XRCE instance for the XRCE application. For example, the audio data generated by the XRCE application, such as music, sound effects, interaction sounds, etc. may be passed by the local XRCE application to the XRCE instance for a particular device. In certain cases, the XRCE application may also pass metadata about the audio data, such as timing information, directional information, and the like, to the XRCE instance to help control playback of audio data. The XRCE instance may then transmit a representation or indication of the audio data to other devices of the XRC session participating in the application experience, for reproduction by the other devices. Voice audio data, as between participants of the application experience, may be handled by the XRCE instance. For example, during an XRC session, voice audio data is received from participants of the XRC session to generate an audio stream which is passed between, and played back by, devices participating in the XRC session as appropriate. During the application experience, the XRCE instance continues to handle the voice audio data. Audio data generated by the XRCE application may be sent, for example by an API, to the XRCE instance and integrated into the audio stream. For example, the XRCE application may provide audio data, which may be incorporated into the audio stream of the XRCE instance and sent to the other participants for playback. A received audio stream may be processed by the XRCE instance and the audio data of the XRCE application may either be directly presented by the XRCE instance or the audio data may be extracted from the received audio stream and passed to the XRCE application for playback without access by the XRCE application to other audio data, such as the voice audio data, in the rest of the audio stream. As the XRCE application only has access to the audio data generated by or used by the XRCE application, the XRCE application cannot access the voice audio data as between the participants of the application experience. In certain cases, the XRCE application may be able to control aspects of the voice audio data, for example, by providing directionality, muting, or other information to the XRCE. This information may be provided on a participant by participant basis or for all participant of the application experience. In certain cases, the voice audio data may be processed and/or transmitted by another XRCE application. This other XRCE application may be integrated into the XRCE, for example, as a first part logical component of the XRCE, or as a trusted application, either first or third party.

Figure 5:
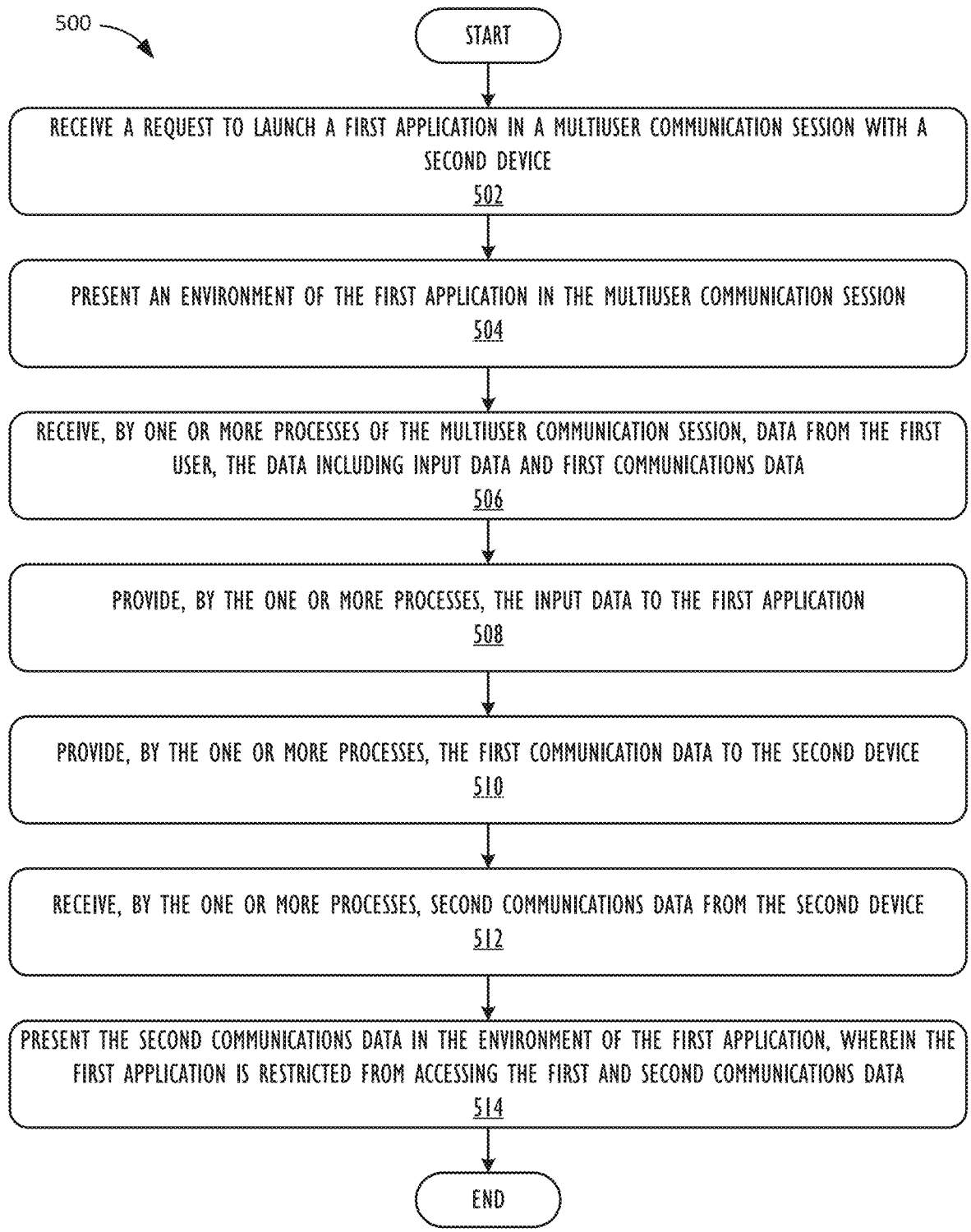
FIG. 5 is a flowchart illustrating a technique for collaborating in a multiuser communication session, in accordance with aspect of the present disclosure.

FIG. 5 is a flowchart illustrating a technique for collaborating in a multiuser communication session 500, in accordance with aspect of the present disclosure. At block 502, a request is received to launch a first application in a multiuser communication session with a second device. For example, multiple users may be collaborating in an XRC session and a first user may start an application experience using an XRCE application. The first user may start the XRCE application, for example, via an interface, such as a menu, of the XRCE. In other cases, the first user may deactivate an XRCE instance on the first device and start the XRCE application, for example via an OS interface or application interface, and start the app experience. At block 504, an environment of the first application is presented in the multiuser communication session. For example, the XRCE application may be presented within the XRC session. In certain cases, an environment of the XRCE application may be presented in place of the XRE of the XRC session. At block 506, one or more processes of the multiuser communication session receives data, the data including input data and first communications data. For example, the first user may provide control input to the XRCE application as well as voice information. This input may be received by the XRCE instance. In some cases, the multiuser communication session may execute using one or more processes. For example, the multiuser communication session may include a process that renders a graphical interface, another process handling communications, etc. In some cases, the multiuser communication session may include a process for interfacing with one or more XRCE applications. This process for interfacing with one or more XRCE applications may be separate from other processes of the multiuser communication session. For example, a first process may provide and/or receive communication data to other devices for the multiuser communication session and another separate process may receive information from and/or present the environment of the XRCE application in the multiuser communication session. In some cases, communication data may be handled by one or more processes integrated into the XRCE, for example, as first part logical components of the XRCE. At block 508, the one or more processes provides the input data to the first application. For example, the control input may be provided by XRCE instance to the XRCE application. At block 510, the one or more processes provides the first communications data to the second device. For example, the XRCE instance may transmit the received voice input data to another device participating in the application experience in the XRC session. The voice input data may be received by the first device, for example, by a microphone of the first device. The voice input may be handled by the XRCE instance and provided to the XRC session without being provided to the XRCE application. At block 512, the one or more processes receives second communications data from the second device. For example, the XRCE instance may receive voice data from another device participating in the application experience in the XRC session. At block 514, the one or more processes presents the second communications data in the environment of the first application, wherein the first application is restricted from accessing the first communications data and second communications data. For example, the XRCE instance presents the received voice data to the first user without providing the received voice data to the XRCE application. The received voice data may be presented, for example, by one or more speakers of the first device.

Figure 6A:
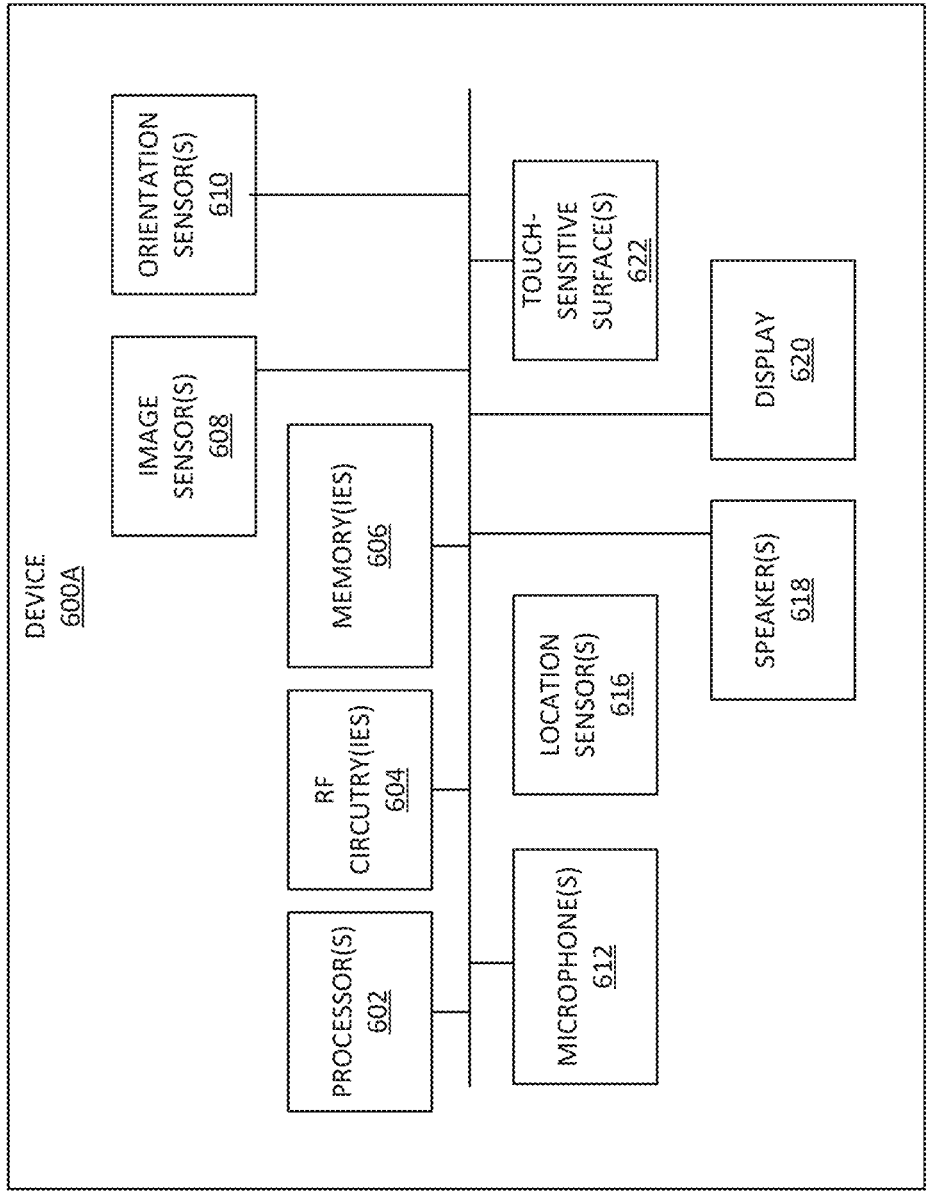
FIGS. 6A-6B show exemplary systems for use in various extended reality technologies.
Figure 6B:
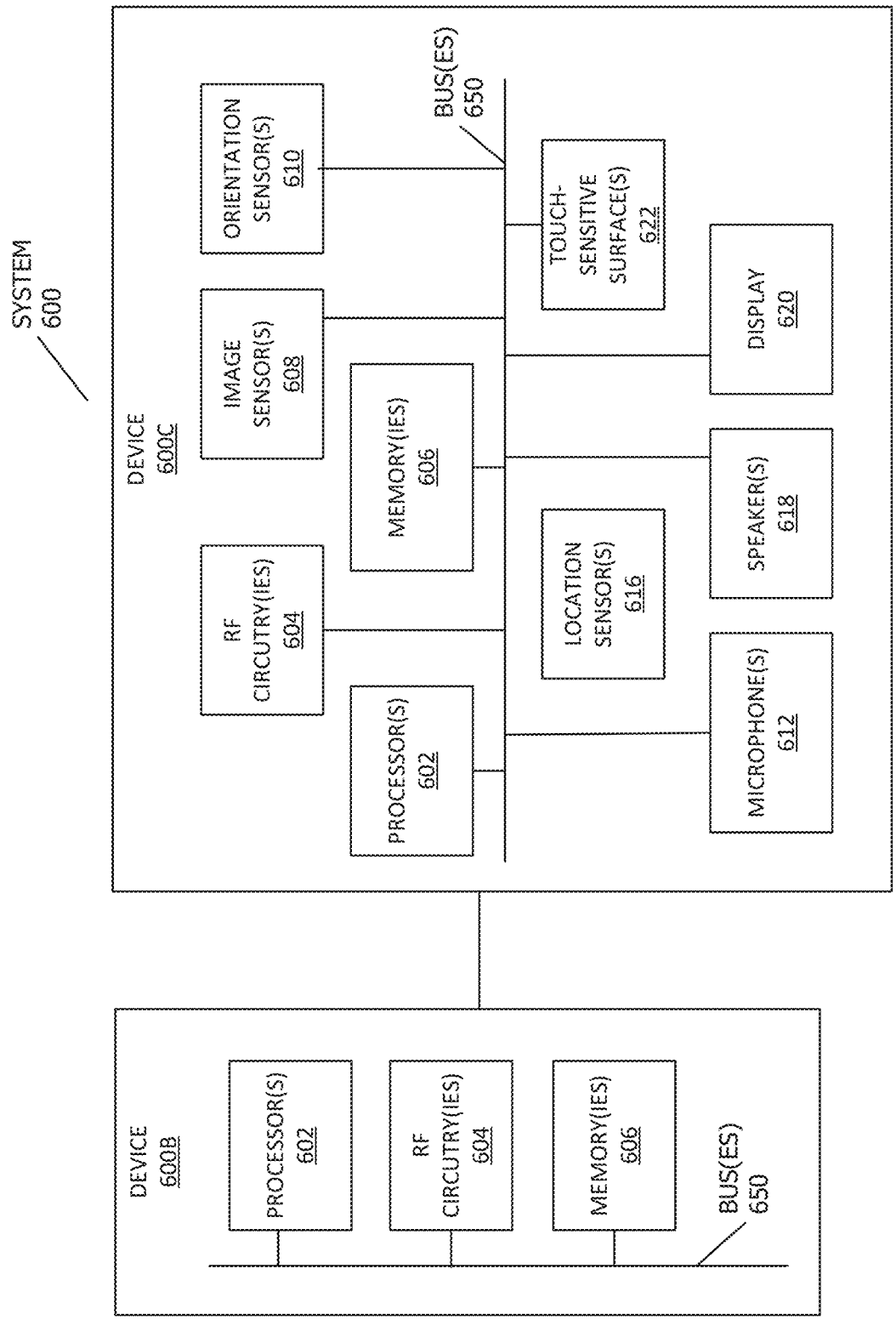

FIG. 6A and FIG. 6B depict exemplary system 600 for use in various extended reality technologies.

In some examples, as illustrated in FIG. 6A, system 600 includes device 600a. Device 600a includes various components, such as processor(s) 602, RF circuitry(ies) 604, memory(ies) 606, image sensor(s) 608, orientation sensor(s) 610, microphone(s) 612, location sensor(s) 616, speaker(s) 618, display(s) 620, and touch-sensitive surface(s) 622. These components optionally communicate over communication bus(es) 650 of device 600a.

In some examples, elements of system 600 are implemented in a base station device (e.g., a computing device, such as a remote server, mobile device, or laptop) and other elements of system 600 are implemented in a second device (e.g., a head-mounted device). In some examples, device 600A is implemented in a base station device or a second device.

As illustrated in FIG. 6B, in some examples, system 600 includes two (or more) devices in communication, such as through a wired connection or a wireless connection. First device 600B (e.g., a base station device) includes processor(s) 602, RF circuitry(ies) 604, and memory(ies) 606. These components optionally communicate over communication bus(es) 650 of device 600B. Second device 600C (e.g., a head-mounted device) includes various components, such as processor(s) 602, RF circuitry(ies) 604, memory(ies) 606, image sensor(s) 608, orientation sensor(s) 610, microphone(s) 612, location sensor(s) 616, speaker(s) 618, display(s) 620, and touch-sensitive surface(s) 622. These components optionally communicate over communication bus(es) 650 of device 600C.

System 600 includes processor(s) 602 and memory(ies) 606. Processor(s) 602 include one or more general processors, one or more graphics processors, and/or one or more digital signal processors. In some examples, memory(ies) 606 are one or more non-transitory computer-readable storage mediums (e.g., flash memory, random access memory) that store computer-readable instructions configured to be executed by processor(s) 602 to perform the techniques described below.

System 600 includes RF circuitry(ies) 604. RF circuitry(ies) 604 optionally include circuitry for communicating with electronic devices, networks, such as the Internet, intranets, and/or a wireless network, such as cellular networks and wireless local area networks (LANs). RF circuitry(ies) 604 optionally includes circuitry for communicating using near-field communication and/or short-range communication, such as Bluetooth®.

System 600 includes display(s) 620. Display(s) 620 may have an opaque display. Display(s) 620 may have a transparent or semi-transparent display that may incorporate a substrate through which light representative of images is directed to an individual's eyes. Display(s) 620 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 620 include heads up displays, automotive windshields with the ability to display graphics, windows with the ability to display graphics, lenses with the ability to display graphics, tablets, smartphones, and desktop or laptop computers. Alternatively, system 600 may be designed to receive an external display (e.g., a smartphone). In some examples, system 600 is a projection-based system that uses retinal projection to project images onto an individual's retina or projects virtual objects into a physical setting (e.g., onto a physical surface or as a holograph).

In some examples, system 600 includes touch-sensitive surface(s) 622 for receiving user inputs, such as tap inputs and swipe inputs. In some examples, display(s) 620 and touch-sensitive surface(s) 622 form touch-sensitive display(s).

System 600 includes image sensor(s) 608. Image sensors(s) 608 optionally include one or more visible light image sensor, such as charged coupled device (CCD) sensors, and/or complementary metal oxide semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 608 also optionally include one or more event camera(s) configured to capture movement of physical elements in the physical setting. Image sensor(s) 608 also optionally include one or more depth sensor(s) configured to detect the distance of physical elements from system 600. In some examples, system 600 uses CCD sensors, event cameras, and depth sensors in combination to detect the physical setting around system 600. In some examples, image sensor(s) 608 include a first image sensor and a second image sensor. The first image sensor and the second image sensor are optionally configured to capture images of physical elements in the physical setting from two distinct perspectives. In some examples, system 600 uses image sensor(s) 608 to receive user inputs, such as hand gestures. In some examples, system 600 uses image sensor(s) 608 to detect the position and orientation of system 600 and/or display(s) 620 in the physical setting. For example, system 600 uses image sensor(s) 608 to track the position and orientation of display(s) 620 relative to one or more fixed elements in the physical setting.

In some examples, system 600 includes microphones(s) 612. System 600 uses microphone(s) 612 to detect sound from the user and/or the physical setting of the user. In some examples, microphone(s) 612 includes an array of microphones (including a plurality of microphones) that optionally operate in tandem, such as to identify ambient noise or to locate the source of sound in space of the physical setting.

System 600 includes orientation sensor(s) 610 for detecting orientation and/or movement of system 600 and/or display(s) 620. For example, system 600 uses orientation sensor(s) 610 to track changes in the position and/or orientation of system 600 and/or display(s) 620, such as with respect to physical elements in the physical setting. Orientation sensor(s) 610 optionally include one or more gyroscopes and/or one or more accelerometers.

The techniques defined herein consider the option of obtaining and utilizing a user's personal information. For example, such personal information may be utilized in order to provide an improved XRE experience and application experience on an electronic device. However, to the extent such personal information is collected, such information should be obtained with the user's informed consent, such that the user has knowledge of and control over the use of their personal information.

Parties having access to personal information will utilize the information only for legitimate and reasonable purposes, and will adhere to privacy policies and practices that are at least in accordance with appropriate laws and regulations. In addition, such policies are to be well-established, user-accessible, and recognized as meeting or exceeding governmental/industry standards. Moreover, the personal information will not be distributed, sold, or otherwise shared outside of any reasonable and legitimate purposes.

Users may, however, limit the degree to which such parties may obtain personal information. The processes and devices described herein may allow settings or other preferences to be altered such that users control access of their personal information. Furthermore, while some features defined herein are described in the context of using personal information, various aspects of these features can be implemented without the need to use such information. As an example, a user's personal information may be obscured or otherwise generalized such that the information does not identify the specific user from which the information was obtained.

It is to be understood that the above description is intended to be illustrative, and not restrictive. The material has been presented to enable any person skilled in the art to make and use the disclosed subject matter as claimed, and is provided in the context of particular embodiments, variations of which will be readily apparent to those skilled in the art (e.g., some of the disclosed embodiments may be used in combination with each other). Accordingly, the specific arrangement of steps or actions shown in FIG. 5 or the arrangement of elements shown in FIGS. 1-4, and 6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for collaborating in a multiuser communication session, comprising:
   receiving a request to launch a first application in a multiuser communication session in which a first device and a second device are active;
   receiving, by the first device, data including input data and first communication data;

providing, by the first device, the input data to the first application; and transmitting, to the second device, the first communication data, wherein the first application is restricted from accessing the first communication data.

2. The method of claim 1, further comprising:

receiving, by the first device, second communication data from the second device; and presenting, by the first device the second communication data with the first application, wherein the first application is restricted from accessing the second communication data.

3. The method of claim 1, wherein the first application is restricted from accessing the first communication data in accordance with a determination that the first application is not trusted application.

4. The method of claim 1, further comprising launching, by the first device, the first application in an extended reality computing environment in accordance with the receiving the request to launch the first application, wherein the first communication data is transmitted by the extended reality computing environment without providing the first communication data to the first application.

5. The method of claim 1, wherein the input data is configured to control a functionality of the first application.

6. The method of claim 1, wherein the first communication data comprises identifiable information related to a user of the first device.

7. The method of claim 1, wherein the first communication data comprises voice audio data received from a user of the first device.

8. A non-transitory computer readable medium comprising computer readable code executable by one or more processors to:

receive a request to launch a first application in a multiuser communication session in which a first device and a second device are active;

receive, by the first device data including input data and first communication data;

provide, by the first device, the input data to the first application; and transmit, to the second device, the first communication data, wherein the first application is restricted from accessing the first communication data.

9. The non-transitory computer readable medium of claim 8, further comprising computer readable code to:

receive, by the first device, second communication data from the second device; and present, by the first device, the second communication data with the first application, wherein the first application is restricted from accessing the second communication data.

10. The non-transitory computer readable medium of claim 8, wherein the first application is restricted from accessing the first communication data in accordance with a determination that the first application is not trusted application.

11. The non-transitory computer readable medium of claim 8, further comprising computer readable code to launch the first application in an extended reality computing environment in accordance with receiving the request to launch the first application, wherein the first communication data is transmitted by the extended reality computing environment without providing the first communication data to the first application.

12. The non-transitory computer readable medium of claim 8, wherein the input data is configured to control a functionality of the first application.

13. The non-transitory computer readable medium of claim 8, wherein the first communication data comprises identifiable information related to a user of the first device.

14. The non-transitory computer readable medium of claim 8, wherein the first communication data comprises voice audio data received from a user of the first device.

15. A system comprising:

one or more processors; and one or more non-transitory computer readable medium comprising computer readable code executable by one or more processors to:

receive a request to launch a first application in a multiuser communication session in which a first device and a second device are active;

receive, by the first device, data including input data and first communication data;

provide, by the first device, the input data to the first application; and transmit, to the second device, the first communication data, wherein the first application is restricted from accessing the first communication data.

16. The system of claim 15, further comprising computer readable code to:

receive, by the first device, second communication data from the second device; and present, by the first device, the second communication data with the first application, wherein the first application is restricted from accessing the second communication data.

17. The system of claim 15, wherein the first application is restricted from accessing the first communication data in accordance with a determination that the first application is not trusted application.

18. The system of claim 15, further comprising computer readable code to launch the first application in an extended reality computing environment in accordance with receiving the request to launch the first application, wherein the first communication data is transmitted by the extended reality computing environment without providing the first communication data to the first application.

19. The system of claim 15, wherein the first communication data comprises identifiable information related to a user of the first device.

20. The system of claim 15, wherein the first communication data comprises voice audio data received from a user of the first device.

* * * * *